US012585465B2

(12) United States Patent
Dey et al.

(10) Patent No.: US 12,585,465 B2
(45) Date of Patent: Mar. 24, 2026

(54) DYNAMIC PROJECT PLANNING FOR SOFTWARE DEVELOPMENT PROJECTS

(71) Applicant: Accenture Global Solutions Limited, Dublin (IE)

(72) Inventors: Kuntal Dey, Birbhum (IN); Kapil Singi, Bangalore (IN); Vibhu Saujanya Sharma, Bangalore (IN); Vikrant Shyamkant Kaulgud, Pune (IN); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 275 days.

(21) Appl. No.: 18/228,325

(22) Filed: Jul. 31, 2023

(65) Prior Publication Data

US 2025/0045048 A1    Feb. 6, 2025

(51) Int. Cl.
G06F 8/77 (2018.01)
G06F 11/3668 (2025.01)

(52) U.S. Cl.
CPC ............ G06F 8/77 (2013.01); G06F 11/3672 (2013.01)

(58) Field of Classification Search
None
See application file for complete search history.

(56) References Cited

U.S. PATENT DOCUMENTS 8,055,606 B2    11/2011  Kreamer et al.
8,290,806 B2    10/2012  Lee et al.

9,626,164 B1     4/2017  Fuchs
10,353,807 B2 *  7/2019  Pandey ............... G06F 11/3688
11,632,315 B1 *  4/2023  Sawai ................ H04L 41/0627
                                                          709/224

(Continued)

FOREIGN PATENT DOCUMENTS

EP          3379409 A1      9/2018

OTHER PUBLICATIONS

Extended European Search Report for Application No. 24185560.0, dated Dec. 11, 2024 (10 Pages).

(Continued)

*Primary Examiner* — Andrew M. Lyons
(74) *Attorney, Agent, or Firm* — Mannava & Kang, P.C.

(57)           ABSTRACT

Methods, systems, and apparatus, including computer programs encoded on computer storage media, for generating and updating project plans for software development projects. In one aspect, a method includes obtaining data indicative of initial project plan parameters associated with a software development project; identifying multiple program modules associated with the software development project; obtaining, for a first set of modules of the multiple modules, corresponding source code segments; executing a quality assessment process to compute, for each corresponding source code segment, a corresponding quality score; identifying, based on the quality scores, that at least a subset of the corresponding source code segments are integrable into a corresponding first subset of the first set of modules; and generating a revised project plan by generating updates to the initial project plan parameters by accounting for the corresponding source code segments being integrated in to corresponding ones of the first set of modules.

15 Claims, 5 Drawing Sheets

300

Obtain data indicative of initial project plan parameters associated with a software development project — 302

Identify multiple program modules associated with the software development project — 304

Obtain corresponding source code segments — 306

Execute a quality assessment process to compute a quality score — 308

Identify that at least a subset of the corresponding source code segments are integrable — 310

Generate a revised project plan by generating updates to the initial project plan parameters — 312

(56) References Cited

U.S. PATENT DOCUMENTS

| | | | |
|---|---|---|---|
| 2008/0263505 A1* | 10/2008 | StClair ...................... | G06F 8/10 |
| | | | 717/106 |
| 2008/0313595 A1 | 12/2008 | Boulineau et al. | |
| 2014/0298286 A1* | 10/2014 | Howard ................... | G06F 8/20 |
| | | | 717/104 |
| 2019/0294428 A1* | 9/2019 | Scheiner ................ | H04L 67/34 |
| 2020/0174760 A1 | 6/2020 | Fuchs | |
| 2022/0188079 A1 | 6/2022 | Kohisseri et al. | |
| 2022/0261240 A1* | 8/2022 | Abbas ...................... | G06F 8/71 |

OTHER PUBLICATIONS

Sethuraman et al., "Agents assisted software project management," Proceedings of the 1st Bangalore Annual Compute Conference, Bangalore, India, Jan. 18-20, 2008, 8 pages.

* cited by examiner

400

Execute multiple pre-defined test cases using the corresponding source code segment          402

Assign the corresponding quality score based on outcomes of the multiple pre-defined test cases          404

500

Assign at least a second subset of the first set of modules for a manual coding process — 502

Receiving information indicating that source code segments corresponding to at least a portion of the second subset is available — 504

Updating the revised project plan — 506

DYNAMIC PROJECT PLANNING FOR SOFTWARE DEVELOPMENT PROJECTS

FIELD

This specification generally relates to software product development and project management and, in particular, relates to estimating and generating project plans for software product development.

BACKGROUND

Proper cost and timeline estimation is often an important step in the process of software product development. In many cases, the end objective of a software product development lifecycle is to meet expectations as closely as possible and to optimize use of available resources.

Some project timeline/cost estimation involves formula-based estimation models based on productivity, component counts, technology, and industry type. These models often do not account for the adoption of artificial intelligence (AI) during the software product development. For example, if a portion of code segment associated with the software development project is readily available in the open-source marketplace, or generated using a generative AI tool—thereby shortening production time and cost—the models may not be able to accurately account for such automation.

SUMMARY

This specification generally describes planning systems and techniques that can generate and update a project plan for a software development project that dynamically accounts for automation—e.g., retrieval of a portion of code segment from a repository (such as one associated with an open-source marketplace) or the adoption of artificial intelligence (e.g., generative AI)—during the software product development.

According to some implementations, a method can include obtaining, at one or more processing devices, data indicative of initial project plan parameters associated with a software development project; identifying, by the one or more processing devices, based on specifications associated with the software development project, multiple program modules associated with the software development project; obtaining, for a first set of modules of the multiple modules, corresponding source code segments, wherein the corresponding source code segments are obtained either by executing a search process on one or more source code repositories, or generated at least in part using an automated code generator; executing, by the one or more processing devices, a quality assessment process to compute, for each corresponding source code segment, a corresponding quality score, wherein executing the quality assessment process comprises: executing multiple pre-defined test cases using the corresponding source code segment, and assigning the corresponding quality score based on outcomes of the multiple pre-defined test cases; identifying, by the one or more processing devices based on the quality scores, that at least a subset of the corresponding source code segments are integrable into a corresponding first subset of the first set of modules; and generating, by the one or more processing devices, a revised project plan by generating updates to the initial project plan parameters by accounting for the corresponding source code segments being integrated in to corresponding ones of the first set of modules.

Other implementations include corresponding computer systems, apparatus, and computer programs recorded on one or more computer storage devices, each configured to perform the actions of the methods.

Implementations can include one or more of the following features. The method can further include assigning, by the one or more processing devices based on the quality scores, at least a second subset of the first set of modules for a manual coding process; receiving, by the one or more processing devices, information indicating that source code segments corresponding to at least a portion of the second subset are available; and updating, by the one or more processing devices, the revised project plan based at least on the information indicating that the source code segments corresponding to at least the portion of the second subset are available.

The source code segments corresponding to at least a portion of the second subset can be obtained from a source code repository.

The source code segments corresponding to at least a portion of the second subset can be generated using an automated code generator.

Assigning the corresponding quality score based on outcomes of the multiple pre-defined test cases can include determining a total number or percentage of the pre-defined test cases passed by the corresponding source code segment.

The method can further include monitoring a progress of development of the software development project; and updating the revised project plan, comprising updating the assignment, a cost estimate, a time duration estimate, or a combination thereof, based on the progress that has been made in the development.

The methods in accordance with the present disclosure can include any combination of the aspects and features described herein. That is, methods in accordance with the present disclosure are not limited to the combinations of aspects and features specifically described herein, but also may include other combinations or subcombinations of the aspects and features provided.

Particular embodiments of the subject matter described in this specification can be implemented to realize one or more of the following advantages.

The technology described in this specification, facilitates ongoing, cost-and-quality aware project management based on monitoring potential automation of portions of software development projects. For example, the technology espouses monitoring for usage of source code segments generated with at least some measure of automation during the software development project, assessing the quality of the source code segments, and accordingly, adjusting a project plan to account for the integration of these source code segments into program modules associated with the project. By allowing for potentially more accurate estimation of time duration, and/or resource costs required to develop or modify software products, the technology described herein can potentially shorten the development cycle of projects, as well as promote optimal consumption of resources (e.g., hardware computing resources, cloud resources etc.).

The details of one or more implementations of the present disclosure are set forth in the accompanying drawings and the description below. Other features and advantages of the present disclosure will be apparent from the description, drawings, and from the claims.

BRIEF DESCRIPTION OF THE DRAWINGS

Like reference numbers and designations in the various drawings indicate like elements.

DETAILED DESCRIPTION

Figure 1:
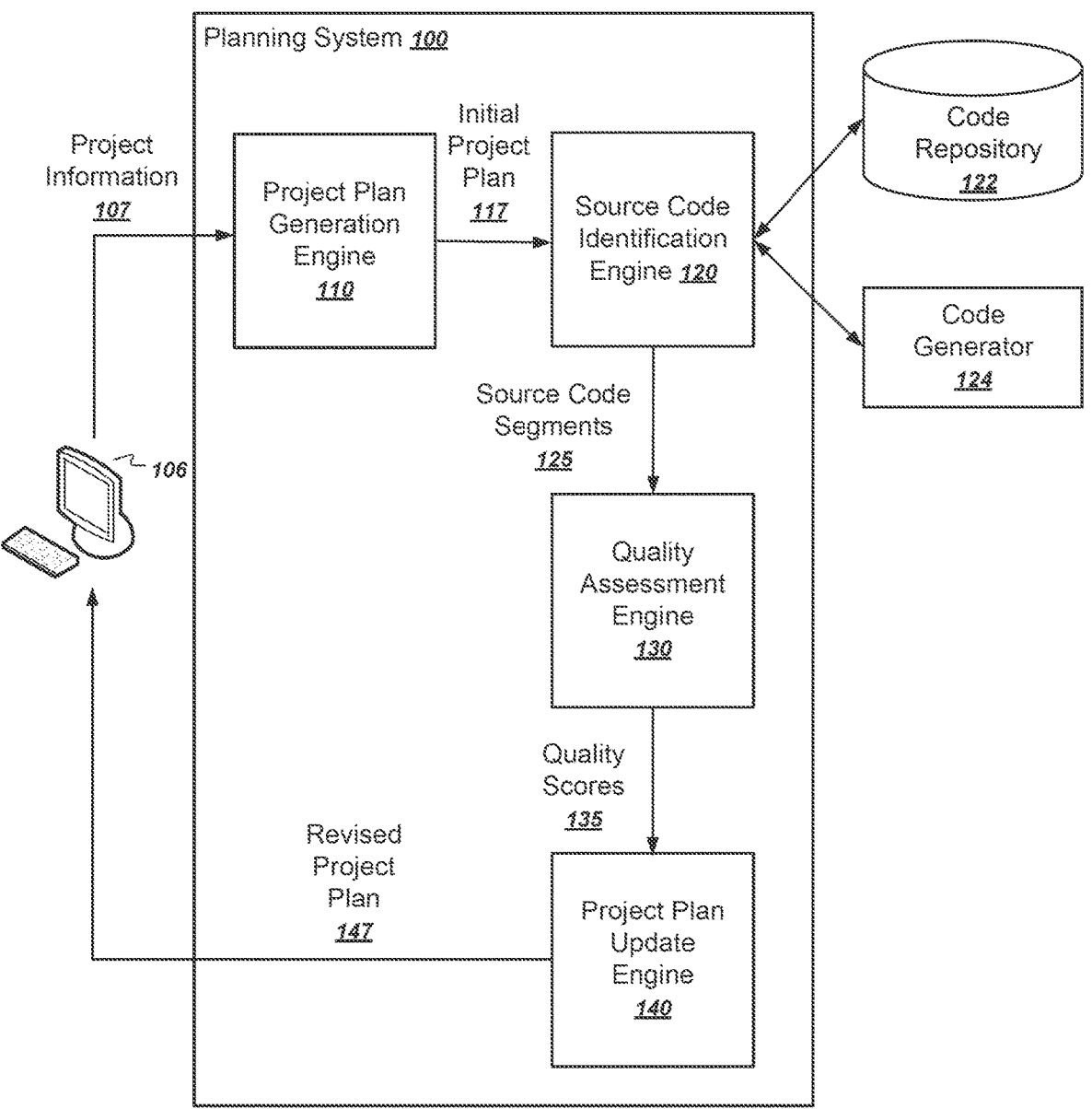
FIG. 1 is an example planning system for generating project plans.

FIG. 1 depicts an example planning system 100 for generating project plans. The planning system 100 is an example of a system implemented as computer programs on one or more computers in one or more locations, in which the systems, components, and techniques described below can be implemented. For example, the planning system 100 may be implemented in enterprises, such as an Information Technology (IT) enterprise or a software solution enterprise, for generating project plans for software development projects based on project information. A software development project may refer to a project for developing new software application(s) or modifying existing software application(s).

The project information 107 describing the software development project is received by the planning system 100 from the user of a client device 106, e.g., a project manager. The project information 107 may include information specifying the software implementation project, e.g., a project scope, a project delivery method, a project complexity, and so on. The project information 107 may also include information describing requirements, e.g., timing or resource requirements, of the software development project, and so on.

The planning system 100 is capable of performing project management, including generating an initial project plan 117 based on the project information 107, generating a revised project plan 147 based on monitoring the fulfillment of the initial project plan 117, and, in some implementations, assigning resources to complete tasks associated with the revised project plan 147. During project management, the user of the client device 106 can interact with the planning system 100 to estimate project delivery details, such as the duration and cost of the software development project.

While FIG. 1 illustrates one client device 106, the planning system 100 can perform the project management on behalf of many client devices. In other words, the planning system 100 can receive respective project information specifying different software development projects from two or more client devices and perform the project management for the different projects. Some of the client devices 106 can be physically adjacent to the planning system 100, e.g., located within a same data center as (some parts of) the planning system 100, or can alternatively be a cloud client that is remote from the planning system 100. A client device can be, for example, a desktop computer, a laptop computer, a tablet computer, a wearable computer, a cellular phone, a smart phone, a music player, an e-book reader, a navigation system, or any other appropriate computing device. A client device can communicate with the planning system 100 over a data communication network, e.g., a wide area network ("WAN"), e.g., the Internet, or a local area network ("LAN").

The planning system 100 includes a project plan generation engine 110, a source code identification engine 120, a quality assessment engine 130, and a project plan update engine 140. The project plan generation engine 110 can generate an initial project plan 117 for a software development project based on the project information 107 that is received from the client device 106. To do this, the project plan generation engine 110 can use any of a variety of project planning and/or scheduling techniques including, e.g., an agile project management technique, a waterfall project management technique, a hybrid project management technique, and a machine learning-based project management technique.

A project plan can include an estimation of end to end project duration (e.g., measured in hours, days, or weeks), an estimation of total project costs (e.g., costs of computing resources including processor, memory, and/or network communications hardware, costs of labor resource, or the like), a set of tasks for a set of resources (e.g., a set of developers or hardware assigned to perform tasks to complete the software implementation project), requirements information (e.g., information indicating the quality requirements of the produced results of the software development project), a set of project milestones, and so on.

In some implementations, the project plan can usually be parameterized. The parameters of the project plan can include task parameters, for example, complexity of a task, skills and/or roles-which resource(s) can perform a task, estimated duration to complete a task, estimated cost to complete a task, and the like. The parameters of the project plan can also include resource parameters, for example, available capacities of a resource, productivities of a resource, quality ratings of a resource, and the like. The parameters of the project plan can also include assignment parameters, for example, a parallel task assignment to different resources in which multiple tasks are performed by the assigned resources concurrently, or a hierarchical task assignment different resources in which one task is performed by one or more assigned resources only upon the completion of another task.

The source code identification engine 120 identifies, e.g., based on the project information 107, the initial project plan 117, or both, and possibly other information, multiple program modules (or components) associated with the software development project. A program module logically represents a particular functionality of the project. A program module can include, for example, routines, programs, objects, components, logic, data structures, or the like that perform particular functionalities associated with the program module. In some implementations, a program module can include a number of source code segments that can be defined, e.g., written, in one or more high level procedural or object oriented programming languages.

The source code identification engine 120 obtains corresponding source code segments 125 for one or more of the program modules. A source code segment 125 may refer to a component or portion of a larger collection of source code for implementing the program module. The collection of source code can be segmented into multiple segments by using any of a variety of techniques including, e.g., a software mining technique, a program comprehension technique, a reverse engineering technique, a code parsing technique, and so on. In some cases, source code identification engine 120 can obtain arbitrarily large number of source code segments for each of one or more program modules.

The source code identification engine 120 can obtain the source code segments 125 in any of a variety of ways. For example, some implementations of the planning system 100 can include or have access to one or more source code repositories, e.g., source code repository 122. A source code repository may be a file archive and web hosting facility that stores large amounts of source code segments. For example, the development environment for a large, enterprise software development project may have an arbitrarily large number of source code segments stored, e.g., "checked-in" by a developer, in a source code repository. The source code segments residing in the source code repositories may be written in the same or different programming languages. The source code segments may represent source code files, modules, object definitions, methods, functions, groups or lines of code, or any combination of these and other source code segments.

In this example, the source code identification engine 120 can execute a search process, e.g., using an application programming interface (API) or another data interface made available by the repository, to identify the corresponding source code segments. For example, the search process can include generating a search query, e.g., that includes a technical definition of the source code, a term or an expression, or the like, and then using the search query to identify source code segments in the source code repository responsive to, e.g., that satisfy a similarity threshold to, the search query.

As another example, some implementations of the planning system 100 can include or have access to one or more artificial intelligence (AI) code generators, e.g., AI code generator 124. AI Code generators implement trained machine learning models to generate source code. Source code generation may refer to the process of automatically creating source code, e.g., from a higher-level representation, such as a design specification, a graphical model, or a natural language description, or some other source code.

In this example, the source code identification engine 120 can obtain source code segments 125 by using an AI code generator to translate plain words into new source code segments, and/or suggest enhancements and bug-fixes to existing source code segments. Compared with manual programming, AI code generation can generally save time, reduce errors, improve the quality and maintainability of source code, and make source code more consistent and portable.

After obtaining these source code segments 125, the planning system 100 uses the quality assessment engine 130 to evaluate the quality of the obtained source code segments. For example, the quality assessment engine 130 can be configured to analyze a source code segment 125 and generate a code quality metric based on the results of analysis performed on the source code segment. In the example of FIG. 1, the code quality metric takes the form of quality scores 135, and the quality assessment engine 130 can apply any of a variety of quality assessment processes to compute such a quality score.

For example, the quality assessment process can be a static analysis process, which analyzes the source code segment for common bug patterns, such as variable overflow, improper intrinsic typecasts, mismatched nesting structures, endless loops, use of deprecated methods or properties, unhandled boundary conditions, and the like. As another example, the quality assessment process can be a dynamic analysis process, which analyzes the source code segment during stress testing or while running in production to identify potential performance metrics or problems, such as transaction times, number of database locks, memory usage, number of remote service calls, number of garbage collection cycles, and the like.

In either example, the quality assessment process generally involves executing a number of pre-defined test cases, and, optionally, test data, using a source code segment 125. The pre-defined test cases can include test cases for unit testing, integration testing, system testing, regression testing, performance testing, usability testing, security testing, and so on. A test case can define, for example, a set of conditions that must be satisfied such that the activities of the function represented by the source code segment 125 are executed successfully. For example, a test case can be written, e.g., by a quality control engineer, to define that, when certain inputs are consumed by the source code segment, certain outcomes should be achieved.

The quality score 135 for a source code segment 125 can then be computed by the quality assessment engine 130 based on the outcomes of the execution of the pre-defined test cases. For example, for a given source code segment 125, its quality score 135 can be computed based on the number of test cases passed by the source code segment, e.g., as a percentage of test cases passed, relative to the total number of test cases executed. The quality score 135 can also be computed using more sophisticated ways, e.g., based on user requirements and/or other quality metrics, such as code complexity metrics.

The quality assessment engine 130 returns the quality scores 135 to the planning system 100, which then uses the quality scores 135 to determine one or more subsequent actions that can be performed with respect to the obtained source code segments 125 and, to generate a revised project plan 147 as a result of performing those subsequent actions.

Figure 2:
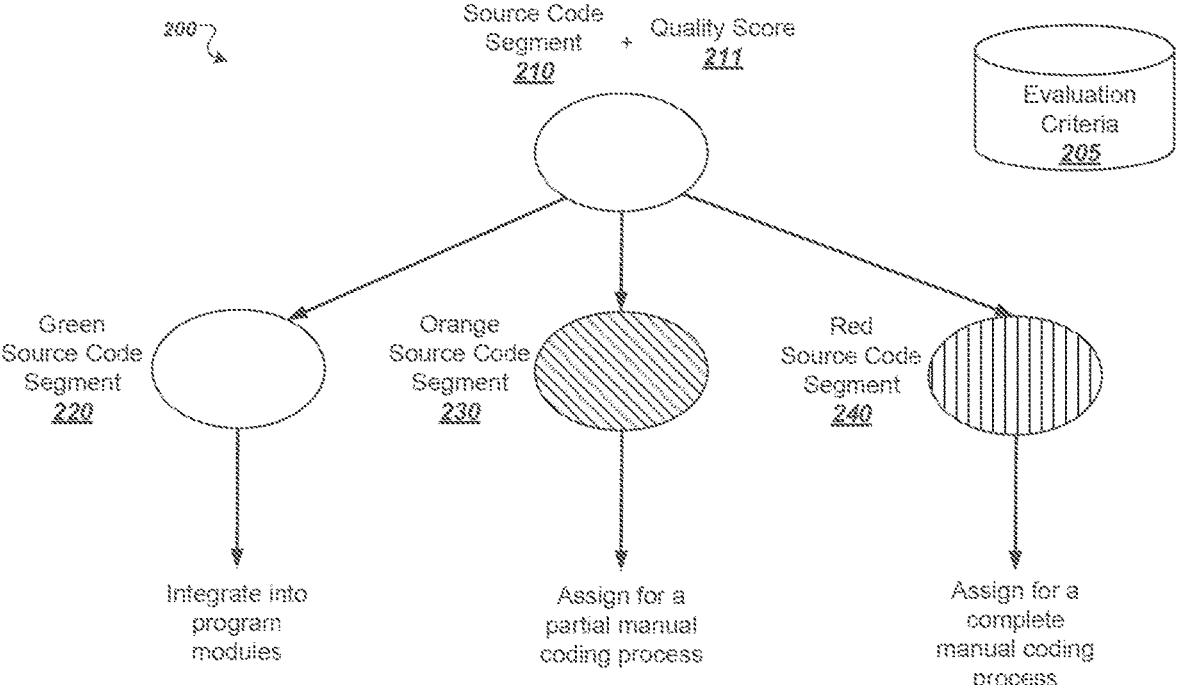
FIG. 2 is an example illustration of classifying a source code segment based on a corresponding quality score.

FIG. 2 is an example illustration of classifying a source code segment based on a corresponding quality score. As illustrated, the planning system 100 receives a corresponding quality score 211 for a source code segment 210 and evaluates the quality score 211 in accordance with a set of evaluation criteria 205. For example, the set of evaluation criteria 205 can include one or more predefined quality thresholds, e.g., an upper quality threshold and a lower quality threshold, and the planning system 100 can classify the source code segment 210 into one of multiple classifications based on comparing the quality score 211 to these quality thresholds.

In the example of FIG. 2, the multiple classifications for source code segments includes (i) a "green source code segment" classification, (ii) an "orange source code segment" classification, and (iii) a "red source code segment" classification.

When the quality score 211 satisfies, e.g., is higher than, the upper quality threshold, the source code segment 210 will be classified as a green source code segment 220. This means that the source code segment 210 can be integrated into a program module associated with the software development project, with no or minimal manual modifications.

Alternatively, when the quality score 211 dissatisfies, e.g., is lower than, the upper quality threshold but satisfies, e.g., is higher than, the lower quality threshold, the source code segment 210 will be classified as an orange source code segment 230. This means that, before being integrated into any program module, the source code segment 210 needs to be modified by way of a manual coding process. For example, the manual coding process can involve partially rewriting, discarding, or expanding the obtained source code segment in order to improve its quality. For example, the manual coding process can be used to reduce the number of failures occurred, i.e., the number of pre-defined test cases that the source code segment has failed to pass.

Since a manual coding process is required, the planning system 100 can assign one or more tasks associated with the manual coding process to one or more developers. For example, the planning system 100 can determine a development capability of a developer (e.g., a skill profile for the developer, an availability of the developer, or the like), and can assign the tasks to the developer based on the development capability of the developer.

Further alternatively, when the quality score 211 dissatisfies, e.g., is lower than, both the upper quality threshold and the lower quality threshold, the source code segment 210 will be classified as a red source code segment 240. This means that the source code segment 210 should be discarded due to its poor quality. Correspondingly, the planning system 100 determines that a manual coding process is required for developing a new source code segment to replace the source code segment 210. The new source code segment will then be integrated into a program module associated with the software development project.

Like in the case of the orange source code segment discussed above, the planning system 100 can assign one or more tasks associated with the manual coding process to one or more resources. For example, the planning system 100 can determine a development capability of a developer and/or an availability of a computing hardware, and can assign the tasks to the developer based on the development capability of the developer and/or the availability of the computing hardware.

Referring back to FIG. 1, the project plan update engine 140 adjusts the initial project plan 117 to ensure that the efforts associated with integrating the green source code segment 220, modifying the orange source code segment 230, as well as developing the red source code segment 240, are taken into account. In other words, the project plan update engine 140 generates a revised project plan 147 which more accurately characterizes the software development project relative to the initial project plan 117.

For example, the project plan update engine 140 can do this by updating the parameters of the initial project plan 117. In this example, since each green source code segment 220 is integrable into a program module with no or minimal manual modifications, the estimated duration to complete the task(s) associated with the green source code segment 220 can be relatively shorter. Thus, assuming that the initial project plan 117 was generated based on an entirely manual coding process for each task, the project plan update engine 140 can be configured to update the task parameters to shorten the estimated duration to complete the task(s) associated with the green source code segment 220.

However, because searching through the source code repositories and running AI code generators will generally consume a significant amount of computing resources, the cost of computing resource associated with the green source code segment 220 can be relatively higher. The project plan update engine 140 thus might update the task parameters to increase the estimated cost (and in particular, estimated cost of computing resources) to complete the task(s) associated with the green source code segment 220.

On the other hand, since each orange source code segment 230, which is obtained either by executing a search process or using an AI code generator, needs to be subsequently modified by way of a manual coding process prior to being integrated into a program module, both the estimated duration and the estimated computing resources cost to complete the task(s) associated with the green source code segment 220 can be relatively longer. Thus, the project plan update engine 140 might update the task parameters to extend the estimated duration as well as to increase the estimated cost to complete the task(s) associated with the orange source code segment 230.

Because a red source code segment 240 is generated, at least in part, by a manual coding process, the estimated duration to complete the task(s) associated with red source code segments 240 can be relatively longer. However, because a resource-intensive AI code generator is not used, the estimated computing resources cost to complete the task(s) associated with the red source code segment 240 can be relatively lower. Thus, the project plan update engine 140 can be configured to update the task parameters to extend the estimated duration and to lower the estimated cost to complete the task(s) associated with the red source code segment 240.

Once generated, the planning system 100 can provide the revised project plan 147 and, in some cases, information associated with the revised project plan, such as an alert, a schedule, information identifying project milestones, or the like, to the client device 106. Additionally or alternatively, the planning system 100 can implement the revised project plan 147, i.e., provide the revised project plan 147 to assigned resources so as to complete tasks associated with the revised project plan 147, during which the planning system 100 continues to monitor the progress of implementation of the project, and dynamically update the revised project plan based on the progress that has been made in the implementation. For example, the planning system 100 can further update the task assignment, the cost estimate, the time duration estimate, or a combination thereof. In this way, the planning system 100 can facilitate end-to-end implementations of software development projects, thereby improving the technical field of software development.

Furthermore, the planning system 100 can take additional actions based on the revised project plan 147. For example, in response to determining that the increased estimated cost is close to, e.g., within a threshold level from, the target cost of the software development project that is defined in the project information 107, the planning system 100 can disable access to the one or more source code repositories 122, the one or more artificial intelligence (AI) code generators 124, or both during subsequent implementation of the tasks associated with the revised project plan 147. In this way, the planning system 100 can facilitate ongoing, cost-aware management of the software development project, resulting in a reduction in the amount of resources consumed to complete the software development project.

Figure 3:
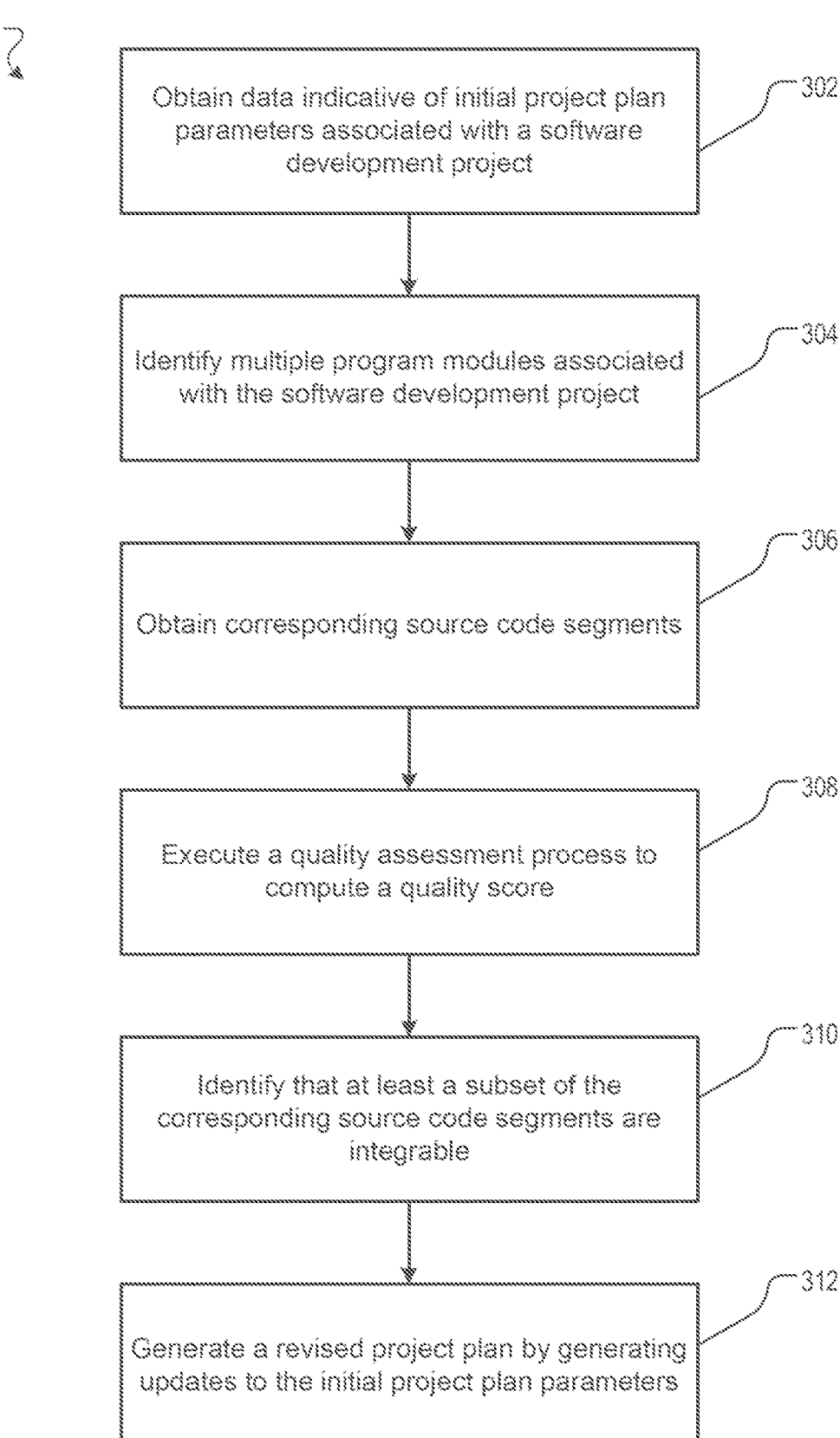
FIG. 3 is a flow diagram of an example process for generating a revised project plan.

FIG. 3 is a flow diagram of an example process 300 for generating a revised project plan. For convenience, the process 300 will be described as being performed by a system of one or more processing devices located in one or more locations. For example, a planning system, e.g., the planning system 100 of FIG. 1, appropriately programmed in accordance with this specification, can perform the process 300.

The system obtains data indicative of initial project plan parameters associated with a software development project (step 302). In some cases, the system can receive project information that includes specifications associated with a software development project from a client device, and correspondingly, generate the initial project plan for the software development project based on the project information. In some others, the system can receive the data indicative the initial project plan as an upload from the client device. The initial project plan can be parameterized. For example, the initial project plan can include one or more task parameters, one or more resource parameters, and/or one or more assignment parameters.

The system identifies multiple program modules associated with the software development project (step 304). The system can do this based on the project information, the initial project plan, or both and possibly other information. In some implementations, a program module logically represents a particular functionality of the project. A program module can include a number of source code segments that can be defined, e.g., written, in one or more high level procedural or object oriented programming languages. A source code segment may refer to a component or portion of a larger collection of source code for implementing the program module.

The system obtains, for a first set of program modules of the multiple program modules, corresponding source code segments (step 306). The source code segments for the first set of program modules include source code segments that have been generated with at least some measure of automation, i.e., instead of or in addition to manual coding. For example, the system can obtain some source code segments for the first set of program modules by executing a search process on one or more source code repositories, and can obtain some other source code segments for the first set of program modules at least in part by using an AI code generator.

The system executes a quality assessment process to compute a corresponding quality score for each corresponding source code segment for the first set of program modules (step 308). Step 308 is explained in more detail with reference to FIG. 4, which shows sub-steps 402-404 corresponding to step 308.

Figure 4:
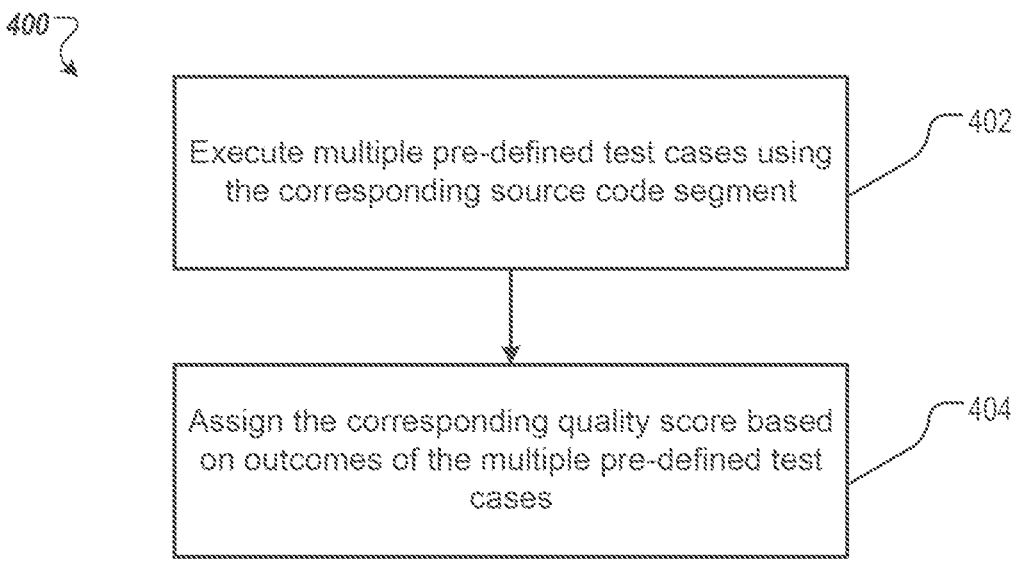
FIG. 4 is a flow diagram of sub-steps of one of the steps of the process of FIG. 3.

FIG. 4 is a flow diagram of sub-steps of one of the steps of the process of FIG. 3. The system can repeatedly perform steps 402-404 for each source code segment for the first set of program modules to determine a corresponding quality score of the source code segment.

The system executes multiple pre-defined test cases, and, optionally, test data, using the source code segment (step 402). The pre-defined test cases can include test cases for unit testing, integration testing, system testing, regression testing, performance testing, usability testing, security testing, and so on. A test case can define a set of conditions that must be satisfied such that the activities of the function represented by the source code segment are executed successfully.

The system assigns the corresponding quality score based on outcomes of the multiple pre-defined test cases (step 404). For example, the system can compute the quality score based on the number of test cases passed by the source code segment, e.g., as a percentage of test cases passed, relative to the total number of test cases executed.

The system identifies, based on the quality scores, that at least a subset of the corresponding source code segments are integrable into a corresponding first subset of the first set of program modules (step 310). Put another way, the system uses the quality scores to determine which of the source code segments that have been generated with at least some measure of automation can be integrated into the first set of program modules.

For each source code segment, the system can be configured to compare its quality score to one or more predefined quality thresholds. For example, when the quality score satisfies an upper quality threshold, the system can determine that the source code segment is integrable into the first subset of the first set of program modules.

Alternatively, when the quality score dissatisfies the upper quality threshold but satisfies a lower quality threshold, the system can determine that, before being integrated into the program module, a manual coding process is required to improve the quality of the source code segment. In other words, the system can assign a second subset of the first set of program modules for a manual coding process, where the first and second subsets of program modules are nonoverlapping subsets of the first set of program modules. This will be described further below with reference to FIG. 5.

Further alternatively, when the quality score dissatisfies both the upper and lower quality thresholds, the system can determine that a manual coding process is required to develop new source code segment to be integrated into the program module, i.e., in place of the source code segments that have been generated with at least some measure of automation. In other words, the system can assign a third subset of the first set of program modules for a manual coding process, where the first, second, and third subsets of program modules are nonoverlapping subsets of the first set of program modules.

The system generates a revised project plan (step 312). The system can do this by generating updates to the parameters of the initial project plan to account for the corresponding source code segments being integrated into the first subset of the first set of program modules.

Specifically, since the source code segments that have been generated with at least some measure of automation can be used largely as-is in the software development project, the estimated duration to complete the task(s) associated with the source code segments can be shortened, to ensure that the revised project plan takes into account the time savings in using automated code generation. On the other hand, because automated code generation relies on searching through the source code repositories and/or running AI code generators which consume a significant amount of computing resources, the estimated computing resource cost to complete the task(s) associated with the source code segments can be increased, to ensure that the revised project plan takes into account the additional hardware costs in using automated code generation.

Analogously, the system can generate updates to the parameters of the initial project plan to account for the manual coding processes required for the second and third subsets of the first set of program modules, e.g., to increase the estimated duration to complete the task(s) associated with the corresponding source code segments of the second and third subsets of the first set of program modules.

In principle, the system can repeatedly perform some or all steps of the process 300 throughout the lifecycle of the software development project to facilitate ongoing management. For example, the system can iterate through all program modules associated with the software development project and, for each respective program module, perform one iteration of steps 308-312 to determine updates to the project plan to account for whether and, if so, how various source code segments that have been generated with at least some measure of automation can be integrated into the respective program module.

Figure 5:
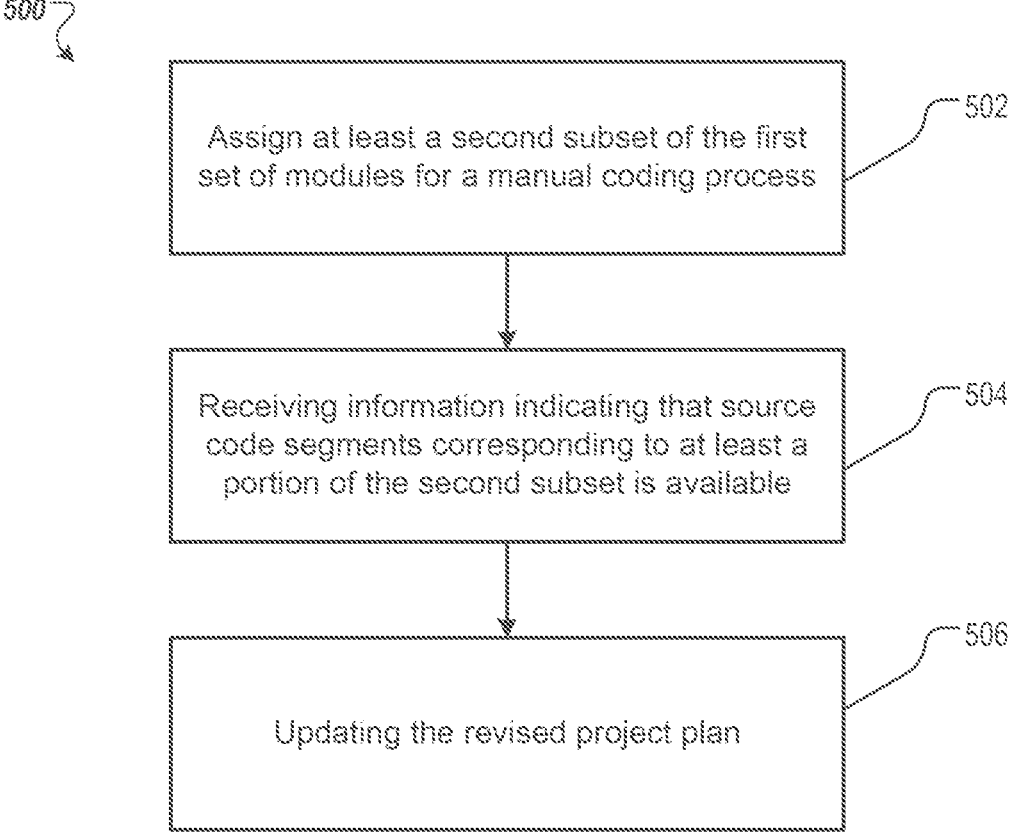
FIG. 5 is a flow diagram of an example process for updating a revised project plan.

FIG. 5 is a flow diagram of an example process 500 for updating a revised project plan. For convenience, the process 500 will be described as being performed by a system of one or more processing devices located in one or more locations. For example, a planning system, e.g., the planning system 100 of FIG. 1, appropriately programmed in accordance with this specification, can perform the process 500.

The system assigns the second subset of the first set of program modules for a manual coding process (step 502). Likewise, the system also assigns the third subset of the first set of program modules for a manual coding process. As described above, this could be because the quality score of a source code segment that has been generated with at least some measure of automation falls short of a predefined quality threshold, e.g., an upper quality threshold, a lower quality threshold, or both.

The system receives information indicating that source code segments corresponding to at least a portion of the second subset (or, analogously, the third subset) are available (step 504). The information can include milestones or status updates from various resources, e.g., developers. For example, the system can be notified by a developer of the newly completed tasks associated with the source code segments. As another example, the system can be made aware that source code segments are available in response to such source code segments being committed or checked-in by a developer.

The system updates the revised project plan based at least on the information indicating that the source code segments corresponding to at least the portion of the second subset (or, analogously, the third subset) are available (step 506). For example, the revised project plan can include updated parameters that reflects adjustments to the task assignment, adjustments to the estimated cost, adjustments to the estimate time duration, or a combination thereof. The system can do this by using any of a variety of project planning/scheduling techniques so as to form realistic expectations about when the project might be completed based on the ongoing progress.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses various kinds of apparatus, devices, and machines for processing data, including by way of example a programmable processor, a computer, or multiple processors or computers. The apparatus can include special purpose logic circuitry, e.g., an FPGA (field programmable gate array), an ASIC (application specific integrated circuit), a neuromorphic research chip, such as Intel's Loihi chip, or a neural network processor, such as BrainChip's Akida™ chip. The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit) a neuromorphic research chip, such as Intel's Loihi chip, or a neural network processor, such as BrainChip's Akida™ chip.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

obtaining, at one or more processing devices, data indicative of initial project plan parameters associated with a software development project;

identifying, by the one or more processing devices, based on specifications associated with the software development project, multiple program modules associated with the software development project;

obtaining, for a first set of modules of the multiple modules, corresponding source code segments, wherein the corresponding source code segments are obtained either by executing a search process on one or more source code repositories, or generated at least in part using an automated code generator;

executing, by the one or more processing devices, a quality assessment process to compute, for each corresponding source code segment, a corresponding quality score, wherein executing the quality assessment process comprises:

executing multiple pre-defined test cases using the corresponding source code segment, and assigning the corresponding quality score based on outcomes of the multiple pre-defined test cases;

identifying, by the one or more processing devices based on the quality scores, that at least a subset of the corresponding source code segments are integrable into a corresponding first subset of the first set of modules;

generating, by the one or more processing devices, a revised project plan by generating updates to the initial project plan parameters by accounting for the corresponding source code segments being integrated in to corresponding ones of the first set of modules;

executing, by the one or more processing devices, additional actions based on the revised project plan, wherein the additional actions include disabling access to the one or more source code repositories and the automated code generator during subsequent implementation of tasks associated with the revised project plan, in response to determining that an estimated cost associated with the revised project plan is close to within a threshold level from a target cost of the software development project;

assigning, by the one or more processing devices based on the quality scores, at least a second subset of the first set of modules for a manual coding process;

receiving, by the one or more processing devices, information indicating that source code segments corresponding to at least a portion of the second subset are available; and updating, by the one or more processing devices, the revised project plan based at least on the information indicating that the source code segments corresponding to at least the portion of the second subset are available.

2. The method of claim 1, wherein the source code segments corresponding to at least a portion of the second subset is obtained from a source code repository.

3. The method of claim 1, wherein the source code segments corresponding to at least a portion of the second subset is generated using an automated code generator.

4. The method of claim 1, wherein assigning the corresponding quality score based on outcomes of the multiple pre-defined test cases comprises:

determining a total number or percentage of the pre-defined test cases passed by the corresponding source code segment.

5. The method of claim 1, further comprising:

monitoring a progress of development of the software development project; and updating the revised project plan, comprising updating the assignment, a cost estimate, a time duration estimate, or a combination thereof, based on the progress that has been made in the development.

6. One or more non-transitory computer-readable storage media storing instructions that when executed by one or more computers cause the one or more computers to perform operations comprising:

obtaining, at one or more processing devices, data indicative of initial project plan parameters associated with a software development project;

identifying, by the one or more processing devices, based on specifications associated with the software development project, multiple program modules associated with the software development project;

obtaining, for a first set of modules of the multiple modules, corresponding source code segments, wherein the corresponding source code segments are obtained either by executing a search process on one or more source code repositories, or generated at least in part using an automated code generator;

executing, by the one or more processing devices, a quality assessment process to compute, for each corresponding source code segment, a corresponding quality score, wherein executing the quality assessment process comprises:

executing multiple pre-defined test cases using the corresponding source code segment, and assigning the corresponding quality score based on outcomes of the multiple pre-defined test cases;

identifying, by the one or more processing devices based on the quality scores, that at least a subset of the corresponding source code segments are integrable into a corresponding first subset of the first set of modules;

generating, by the one or more processing devices, a revised project plan by generating updates to the initial project plan parameters by accounting for the corresponding source code segments being integrated in to corresponding ones of the first set of modules;

executing, by the one or more processing devices, additional actions based on the revised project plan, wherein the additional actions include disabling access to the one or more source code repositories and the automated code generator during subsequent implementation of tasks associated with the revised project plan, in response to determining that an estimated cost associated with the revised project plan is close to within a threshold level from a target cost of the software development project;

assigning, by the one or more processing devices based on the quality scores, at least a second subset of the first set of modules for a manual coding process;

receiving, by the one or more processing devices, information indicating that source code segments corresponding to at least a portion of the second subset are available; and updating, by the one or more processing devices, the revised project plan based at least on the information indicating that the source code segments corresponding to at least the portion of the second subset are available.

7. The computer-readable storage media of claim 6, wherein the source code segments corresponding to at least a portion of the second subset is obtained from a source code repository.

8. The computer-readable storage media of claim 6, wherein the source code segments corresponding to at least a portion of the second subset is generated using an automated code generator.

9. The computer-readable storage media of claim 6, wherein assigning the corresponding quality score based on outcomes of the multiple pre-defined test cases comprises:

determining a total number or percentage of the pre-defined test cases passed by the corresponding source code segment.

10. The computer-readable storage media of claim 6, wherein the operations further comprise:

monitoring a progress of development of the software development project; and updating the revised project plan, comprising updating the assignment, a cost estimate, a time duration estimate, or a combination thereof, based on the progress that has been made in the development.

11. A system comprising one or more computers and one or more storage devices storing instructions that when executed by one or more computers cause the one or more computers to perform operations comprising:

obtaining, at one or more processing devices, data indicative of initial project plan parameters associated with a software development project;

identifying, by the one or more processing devices, based on specifications associated with the software development project, multiple program modules associated with the software development project;

obtaining, for a first set of modules of the multiple modules, corresponding source code segments, wherein the corresponding source code segments are obtained either by executing a search process on one or more source code repositories, or generated at least in part using an automated code generator;

executing, by the one or more processing devices, a quality assessment process to compute, for each corresponding source code segment, a corresponding quality score, wherein executing the quality assessment process comprises:

executing multiple pre-defined test cases using the corresponding source code segment, and assigning the corresponding quality score based on outcomes of the multiple pre-defined test cases;

identifying, by the one or more processing devices based on the quality scores, that at least a subset of the corresponding source code segments are integrable into a corresponding first subset of the first set of modules;

generating, by the one or more processing devices, a revised project plan by generating updates to the initial project plan parameters by accounting for the corresponding source code segments being integrated in to corresponding ones of the first set of modules;

executing, by the one or more processing devices, additional actions based on the revised project plan, wherein the additional actions include disabling access to the one or more source code repositories and the automated code generator during subsequent implementation of tasks associated with the revised project plan, in response to determining that an estimated cost associated with the revised project plan is close to within a threshold level from a target cost of the software development project;

assigning, by the one or more processing devices based on the quality scores, at least a second subset of the first set of modules for a manual coding process;

receiving, by the one or more processing devices, information indicating that source code segments corresponding to at least a portion of the second subset are available; and updating, by the one or more processing devices, the revised project plan based at least on the information indicating that the source code segments corresponding to at least the portion of the second subset are available.

12. The system of claim 11, wherein the source code segments corresponding to at least a portion of the second subset is obtained from a source code repository.

13. The system of claim 11, wherein the source code segments corresponding to at least a portion of the second subset is generated using an automated code generator.

14. The system of claim 11, wherein assigning the corresponding quality score based on outcomes of the multiple pre-defined test cases comprises:

determining a total number or percentage of the pre-defined test cases passed by the corresponding source code segment.

15. The system of claim 11, wherein the operations further comprise:

monitoring a progress of development of the software development project; and updating the revised project plan, comprising updating the assignment, a cost estimate, a time duration estimate, or a combination thereof, based on the progress that has been made in the development.

\* \* \* \* \*